United States Patent [19]
Baker et al.

[11] 4,181,397
[45] Jan. 1, 1980

[54] FIBRE-OPTIC CABLE

[75] Inventors: Peter D. Baker, Basingstoke; Douglas V. Luke, Farnham Common, both of England

[73] Assignee: Smiths Industries Limited, London, England

[21] Appl. No.: 885,241

[22] Filed: Mar. 10, 1978

[30] Foreign Application Priority Data

Mar. 11, 1977 [GB] United Kingdom ............... 10397/77

[51] Int. Cl.$^2$ .............................................. G02B 5/16
[52] U.S. Cl. ............................. 350/96.20; 350/96.26; 350/96.23
[58] Field of Search ............... 350/96.10, 96.23, 96.26, 350/96.20, 63; 362/32; 250/227; 356/43

[56] References Cited
U.S. PATENT DOCUMENTS

| | | | |
|---|---|---|---|
| 2,959,090 | 11/1960 | Davies | 350/63 |
| 3,050,907 | 8/1962 | Hicks, Jr. et al. | 350/96.26 |
| 3,051,035 | 8/1962 | Root | 350/96.26 |
| 3,691,001 | 9/1922 | Takahashi et al. | 350/96.26 |
| 3,699,950 | 10/1922 | Humphrey, Jr. et al. | 350/96.23 |
| 3,750,058 | 7/1973 | Bankert, Jr. et al. | 350/96.23 |

Primary Examiner—Stewart J. Levy
Attorney, Agent, or Firm—Pollock, Vande Sande and Priddy

[57] ABSTRACT

A fibre-optic cable includes a fibre-bundle, for transmitting light along the cable, that is sealed at either end to a metal ferrule. Each end of the fibre-bundle projects a short distance from its respective ferrule and is enclosed by a metal collar which is welded to the ferrule. The projecting ends of the fibre-bundle are sealed to the ferrules by melting a glass tube within each collar about the ends of the fibre-bundle. A thread of glass or Silastomer material extends between the two ferrules and is helically wound about the fibre-bundle so as to hold together the fibres of the fibre-bundle. Convoluted outer metal tubing extends about the fibre-bundle and is welded at each end to respective ferrules. The fibre-bundle is cushioned within the outer tubing by a sleeve of woven fibre which also extends between the two ferrules about the fibre-bundle and the helical thread. The outer tubing may be evacuated or contain an inert gas at low pressure, or the outer tubing could contain a lubricant such as powdered polytetrafluoroethylene. Alternatively, a silicone oil could be used as a lubricant and, where the cable is to have one end mounted at a hot location, the silicone oil could be chosen to be a gel at that end while being a liquid where cooler, away from that end.

16 Claims, 3 Drawing Figures

FIBRE-OPTIC CABLE

BACKGROUND OF THE INVENTION

This invention relates to fibre-optic cable.

The invention is concerned especially with fibre-optic cable that is adapted for use in an environment where it would in normal events be subject to stress that might fracture or otherwise damage the cable and thereby interfere with light-signal transmission along it. Such circumstances may arise, for example, where the cable is used on an engine.

It is an object of the present invention to provide a fibre-optic cable that is less susceptible to stresses and damage such as might otherwise be caused by, for example, high temperatures or flexing of the cable.

BRIEF SUMMARY OF THE INVENTION

According to the present invention there is provided a fibre-optic cable wherein a fibre-bundle extends through a metal ferrule to have one end projecting therefrom, a tube which encloses and is sealed to the projecting end of the fibre-bundle is sealed within a collar, and wherein said collar is welded to said ferrule so that a seal is thereby provided between said fibre-bundle and said ferrule.

In this way, since a seal is formed where one end of the fibre-bundle projects from the ferrule, stresses caused by differential thermal expansion between the fibre-bundle and ferrule are substantially reduced. Moreover, the seal between the fibre-bundle and the ferrule is in effect isolated by the ferrule from the rest of the fibre-bundle and hence the seal is less susceptible to damage caused by, for example, flexing of the cable.

A metal ferrule may be sealed to the fibre-bundle in accordance with the present invention, at both ends. The fibre-bundle between the two ferrules may be enclosed within outer tubing that is sealed to the ferrules. Space between the fibre-bundle and the inside of the outer tubing may be evacuated or contain an inert gas at low pressure. Additionally or alternatively the space may contain a lubricant in liquid form (such as, for example, a silicone oil) or in powder form (such as, for example, powdered polytetrafluorothylene).

A fibre-optic cable in accordance with the present invention and as incorporated in a radiation pyrometer installed on a gas-turbine engine, will now be described,, by way of example, with reference to the accompanying drawings.

DETAILED DESCRIPTION

Figure 1:
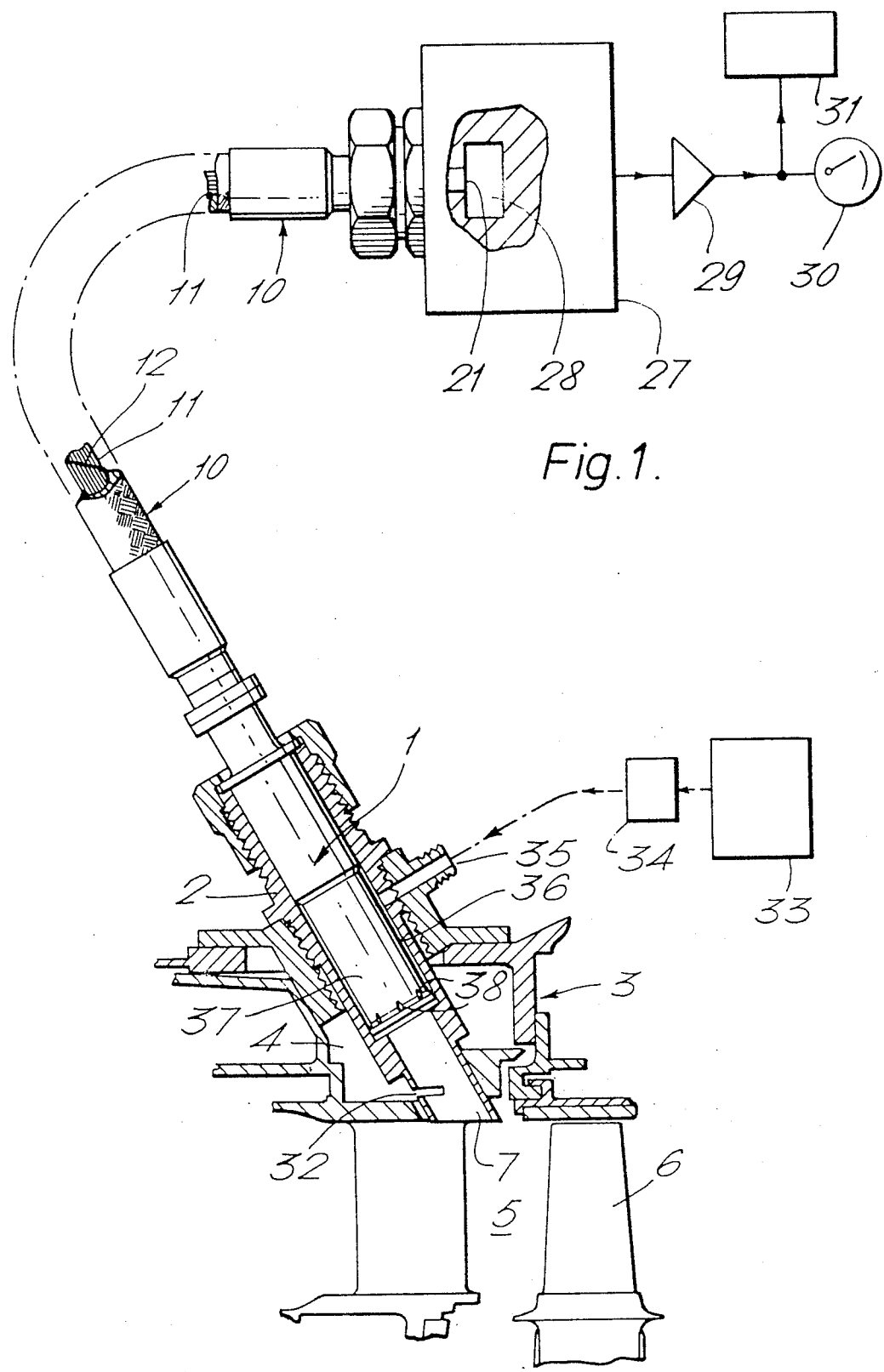
FIG. 1 illustrates the installation in the engine.

Referring more especially to FIG. 1, the radiation pyrometer has an optical head 1 that is enclosed by a metal sleeve 2 mounted on the turbine casing 3 of the engine. The sleeve 2 extends through the engine by-pass duct 4 to the turbine chamber 5 for directing the head 1 towards the turbine blades 6. More particularly, the sleeve 2 incorporates a sighting tube 7 that opens into the chamber 5 from the duct 4 and serves to channel radiation from the blades 6 to a synthetic-sapphire lens 8 (FIG. 2) in the head 1.

Figure 2:
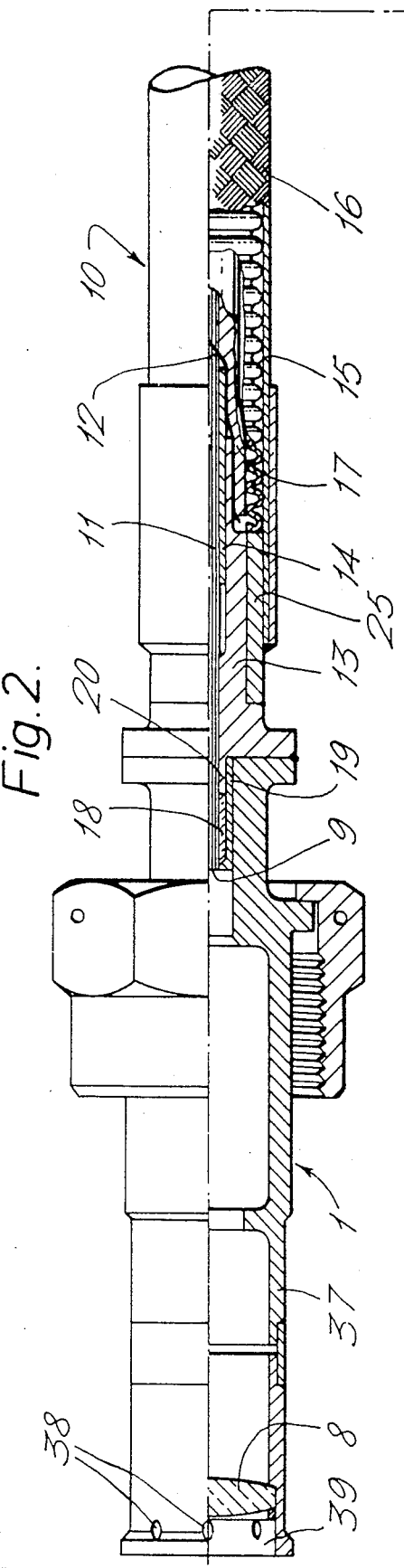
FIG. 2 is a sectional elevation of the radiation pyrometer.
Figure 2:
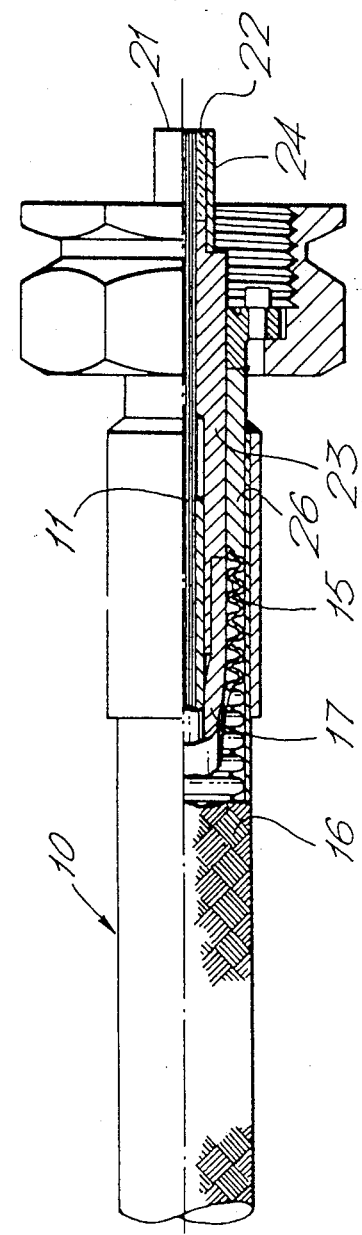
Figure 3:
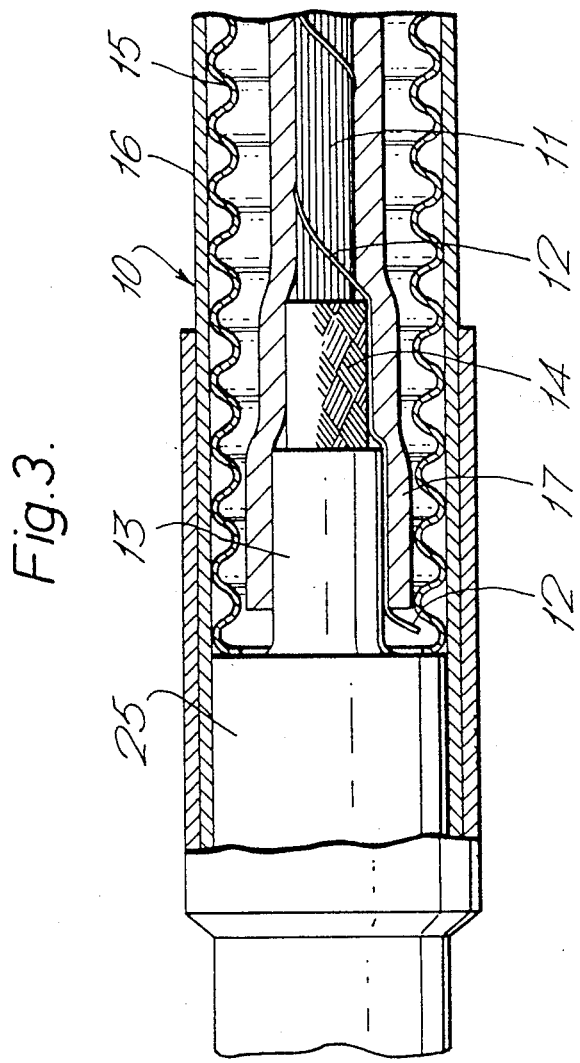
FIG. 3 is an enlarged part-sectional elevation of a portion of the fibre-optic cable.

Referring now more especially to FIGS. 2 and 3, the lens 8 focusses radiation received from the blades 6 onto the end 9 of a fibre-optic cable 10. The fibre-optic cable 10 includes a bundle 11 of glass-fibre strands that are held together loosely by a thread 12 of, for example, glass or silastomer material, wrapped helically about the bundle 11. The bundle 11 extends through a metal ferrule 13 and is protected from damage, by a short sleeve 14 of woven glass-fibre around the bundle 11 where it projects from the ferrule. The bundle 11 is protected externally by stainless-steel convoluted tubing 15 and stainless-steel braid 16, and is cushioned and supported within the tubing 15 by a sleeve 17 formed by a double thickness of an open-weave fibre material. The fibre material may be of glass or silica, or may be a mixture of silica-fibre and asbestos-fibre such as is sold, for example, under the name Refrasil by the Chemical and Insulating Company Limited, Darlington, England.

The end 9 of the fibre-bundle 11 is enclosed by a glass tube 18 which is in turn enclosed by a collar 19 of stainless-steel (for example, EN 58F steel) that is electron-beam welded at one end about a neck portion 20 of the ferrule 13. An hermetic seal is formed between the end 19 of the fibre-bundle 11 and the ferrule 13 by heating the end 9 within the collar 19 such as to cause the glass tube 18 and the individual fibres of the bundle 11 to melt and seal together. The opposite end of the cable 10 is similarly hermetically sealed, being enclosed by a glass tube 22 that is sealed to a metal ferrule 23 by means of a stainless-steel collar 24.

Each end of the convoluted tubing 15 is secured to a respective sleeve 25 and 26 that in turn embrace and are welded to ferrules 13 and 23 respectively so as thereby to seal the cable 10 along its entire length. The space within the tubing 15 contains a powder (such as, for example, powdered polytetrafluoroethylene) or liquid (such as, for example, a silicone oil) lubricant (not shown), and is either evacuated of gas or filled with an inert gas, (such as, for example, argon) at low pressure. Silicone oil may have especial advantages in that, at elevated temperatures, of around 350 to 400 degrees C., and in the presence of air, the oil becomes a gel. This property may be useful in that the oil would seep by capillary action between the fibres of the bundle 11 and could be caused to gel at the hot end 9 of the cable 10, thereby further to support the bundle 11 within the ferrule 13 while permitting free flexing of the remainder of the cable 10. Various silicone oils, each gelling at a different temperature could be used as appropriate, and a normal air atmosphere could be left in the tubing 15 to aid the gelling.

Referring again to FIG. 1, the end 21 of the cable 10 is coupled into a detector unit 27 mounted at a comparatively-cool location on the engine. The unit 27 includes a photoresponsive element 28 that serves to convert the optical signal transmitted via the cable 10 to the end 21 into an electrical signal. This electrical signal provides a measure of turbine-blade temperature and is supplied via an amplifier 29 to both an indicator 30 and an engine-control unit 31.

The accuracy of the electrical signal as a measure of turbine-blade temperature depends on the integrity of the optical signal derived by the head 1. Such integrity is much influenced by any attenuation of the radiation received by the head 1, caused by fouling of the front, exposed surface of the lens 8 with fuel and combustion products within the sighting tube 7. Provision is accordingly made to purge fuel and combustion products from the tube 7 during running of the engine, and in this respect the tube 7 has a slot 32 that opens into the by-pass duct 4. Cooling air as conventionally supplied to the duct 4 from the compressor stage of the engine, flows through the slot 32 into the tube 7 to be exhausted into the chamber 5 so as to block to a substantial extent entry of fuel and combustion products into the tube 7 during running.

The pressure of the cooling air supplied to the duct 4 is however low during starting of the engine and is in general insufficient to ensure that fuel-air mixture does not enter the tube 7 at this time. However purging air effective to block entry of the fuel-air mixture in these conditions, is supplied from a separate source 33.

The air-supply source 33 is coupled via a non-return valve 34 to an inlet 35 on the sleeve 2 to pass low-pressure air (for example, at 80 pounds per square inch) into an annular space 36 between the sleeve 2 and the casing 37 of the head 1. This air is vented from the space 36 across the front surface of the lens 8 into the tube 7 via circumferentially-distributed ports 38 in a lens-retaining ring 39 of the casing 37. The flow of air across the lens 8 into the tube 7 purges the tube 7 free from the fuel-air mixture, and continues as starting proceeds, until the pressure applied to the inlet 35 is exceeded by that in the by-pass duct 4. Air which now flows through the slot 32 from the duct 4 to maintain purging of the tube 7, creates a curtain trapping the volume of clean and virtually stagnant air remaining adjacent the lens 8, above the slot 32. The slot 32 is inclined forwardly to direct flow downwardly of the tube 7 and thereby enhance the curtain effect.

With the installation described above there is the advantage that the tube 7 is purged adequately from the very beginning and at the end of engine operation, thereby minimizing fouling of the lens 8. In this respect it is of especial significance that an adequate purging of the tube 7 is effective during starting to inhibit entry of fuel-air mixture, since any such mixture which might be inadequately purged subsequently would be initially oxidized and then partially reduced as the environmental temperature increases, to form a fine-particle deposit on, in particular the lens 8.

The air-supply source 33 may be an air-bottle or other reservoir that is mounted with the engine and is coupled to a pump to be replenished during engine running.

The construction of cable 10 involving the cushioning of the sheathed bundle 11 provided by the sleeve 17 protects the glass fibres of the bundle 11 from shock and ensures good mechanical damping.

The fibres of the bundle 11 described above are of a glass material, each having an outer layer of different refractive index. Other materials, such as, for example, silica may be used and the fibres may be coated with a thin reflective layer of metal.

The lubricant within the cable 10 reduces wear of the fibre-bundle 11 that would otherwise occur upon flexing and bending of the cable, while the low pressure or inert atmosphere within the cable further improves the useful life of the cable by reducing atmospheric contaminants within the cable. The hermetic seal provided at the end 9 of the cable 10, which functions to retain the lubricant within the cable, also serves to prevent ingress into the cable of any gas or liquid from the engine that might enter the head 1, by, for example, see page around the lens 8.

We claim:

1. A fibre-optic cable comprising: a first metal ferrule; a fibre-bundle for transmission of radiation, said fibre-bundle extending through said first ferrule to have one end projecting from said first ferrule; a metal collar, said collar extending about said projecting end of said fibre-bundle, and said collar being welded to said first ferrule; and a tube of a glass material, said tube being located within said collar around said projecting end of said fibre-bundle, and said tube being melted with the fibres of the fibre-bundle within said collar so that a seal is thereby provided between the said one end of said fibre-bundle and said first ferrule.

2. A fibre-optic cable according to claim 1 including a second metal ferrule, said fibre-bundle extending through said ferrule to have its other end projecting from said second ferrule; a second metal collar, said second collar extending about said other projecting end of said fibre-bundle, and said second collar being welded to said second ferrule; and a second tube of a glass material, said second tube being located within said second collar around said other projecting end of said fibre-bundle, and said second tube being melted with the fibres of the fibre-bundle within said second collar so that a seal is thereby provided between the said other end of said fibre-bundle and said second ferrule.

3. A fibre-optic cable according to claim 2 including outer tubing, said outer tubing extending about said fibre-bundle and said outer tubing being sealed at one end with said first ferrule and at the other end with said second ferrule so as thereby to enclose said fibre-bundle along its length between said first and second ferrules.

4. A fibre-optic cable according to claim 3 including a sleeve of woven fibre, said sleeve extending between said first and second ferrules about said fibre-bundle so as to cushion said fibre-bundle within said outer tubing.

5. A fibre-optic cable according to claim 3 wherein said outer tubing has a convoluted surface.

6. A fibre-optic cable according to claim 3 wherein said outer tubing is evacuated of gas.

7. A fibre-optic cable according to claim 3 wherein said outer tubing contains an inert gas at low pressure.

8. A fibre-optic cable according to claim 3 including a lubricant within said outer tubing, said lubricant being for lubricating the fibres of said fibre-bundle.

9. A fibre-optic cable according to claim 8 wherein said lubricant is in the form of a powder.

10. A fibre-optic cable according to claim 9 wherein said powder is polytetrafluoroethylene.

11. A fibre-optic cable according to claim 8 wherein said lubricant is a silicone oil.

12. A fibre-optic cable according to claim 11 wherein one end of said cable is for mounting at a relatively hot location and wherein said silicone oil is chosen to be a gel at the said one end of said cable when mounted at said hot location, and to be a liquid away from said one end.

13. A fibre-optic cable according to claim 2 including a thread extending between said first and second ferrules, said thread being helically wound around said fibre-bundle so as to hold together the fibres of said fibre-bundle.

14. A fibre-optic cable according to claim 13 wherein said thread is of a glass material.

15. A fibre-optic cable according to claim 13 wherein said thread is of a silastomer material.

16. A fibre-optic cable comprising: a first metal ferrule; a second metal ferrule; a fibre-bundle for transmission of radiation, said fibre-bundle having one end projecting through said first ferrule, and said fibre-bundle having its other end projecting through said second ferrule; a first metal collar, said first collar being welded to said first ferrule, and said first collar extending about said one projecting end of said fibre-bundle; a first glass tube, said first tube extending about said one projecting end of said fibre-bundle within said first collar, and said first tube being sealed with said collar and said fibre-bundle by melting, so as thereby to seal said one end of said fibre-bundle with said first ferrule; a second metal collar, said second collar being welded to said second ferrule, and said second collar extending about said other projecting end of said fibre-bundle; a second glass tube, said second glass tube extending about said other projecting end of said fibre-bundle within said second collar, and said second tube being sealed with said collar and said fibre-bundle by melting, so as thereby to seal said other end of said fibre-bundle with said second ferrule; and outer metal tubing, said outer tubing extending about said fibre-bundle, and said outer tubing being sealed at one end to said first ferrule and at the other end to said second ferrule so as thereby to enclose said fibre-bundle along its length between said first and second ferrules.

* * * * *